May 7, 1935.  V. G. PEW  2,000,249
LAWN MOWER ATTACHMENT
Filed Aug. 8, 1934  3 Sheets-Sheet 1

Inventor
Victor G. Pew

By Clarence A. O'Brien
Attorney

May 7, 1935.　　　　V. G. PEW　　　　2,000,249
LAWN MOWER ATTACHMENT
Filed Aug. 8, 1934　　　3 Sheets-Sheet 2
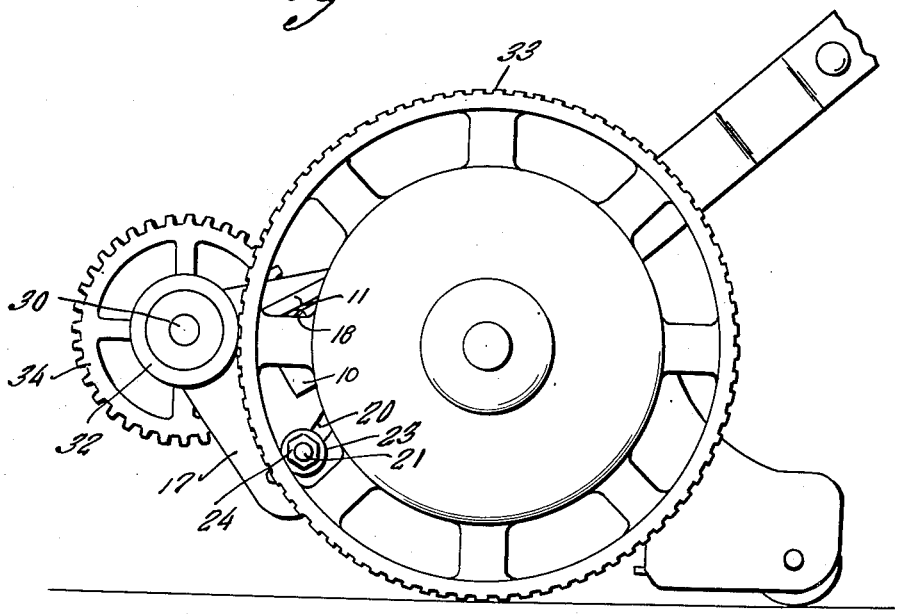
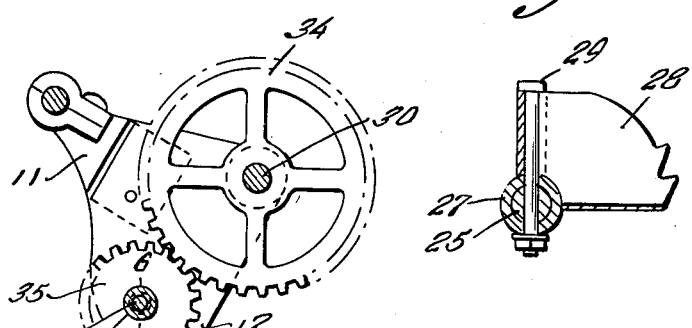
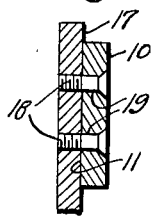
Inventor
Victor G. Pew
By Clarence A. O'Brien
Attorney May 7, 1935. V. G. PEW 2,000,249
LAWN MOWER ATTACHMENT
Filed Aug. 8, 1934 3 Sheets-Sheet 3
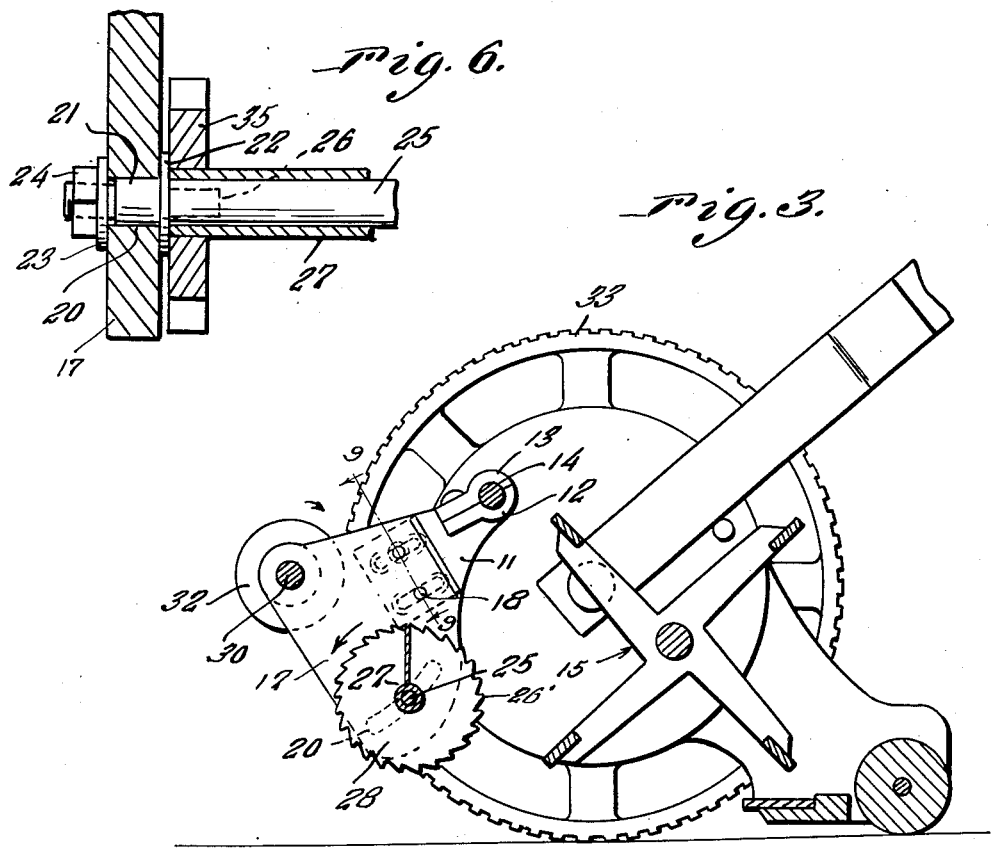
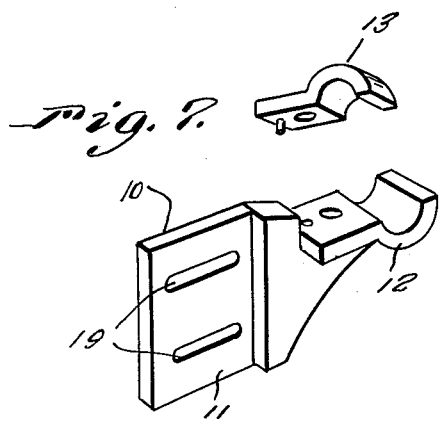
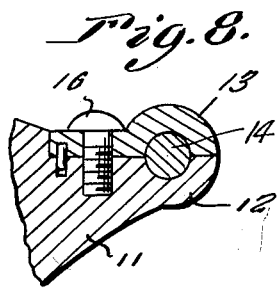
Inventor
Victor G. Pew
By Clarence A. O'Brien
Attorney Patented May 7, 1935

2,000,249

UNITED STATES PATENT OFFICE 2,000,249

LAWN MOWER ATTACHMENT

Victor G. Pew, Kitzmiller, Md.

Application August 8, 1934, Serial No. 739,027

6 Claims. (Cl. 56—294)

This invention is a device for attachment to a lawn mower for the purpose of guiding long grass towards the blades of the reel of the mower for the cutting of such grass which would otherwise only be pressed down, and which now are generally cut through the medium of a scythe or similar tool.

The invention, together with its objects and advantages, will be best understood from a study of the following description taken in connection with the accompanying drawings wherein:

Figure 2 is an end elevational view thereof.

Figure 3 is a transverse sectional view.

Figure 4 is a fragmentary view partly in section and partly in elevation showing the bracket and gear mechanism.

Figure 1:
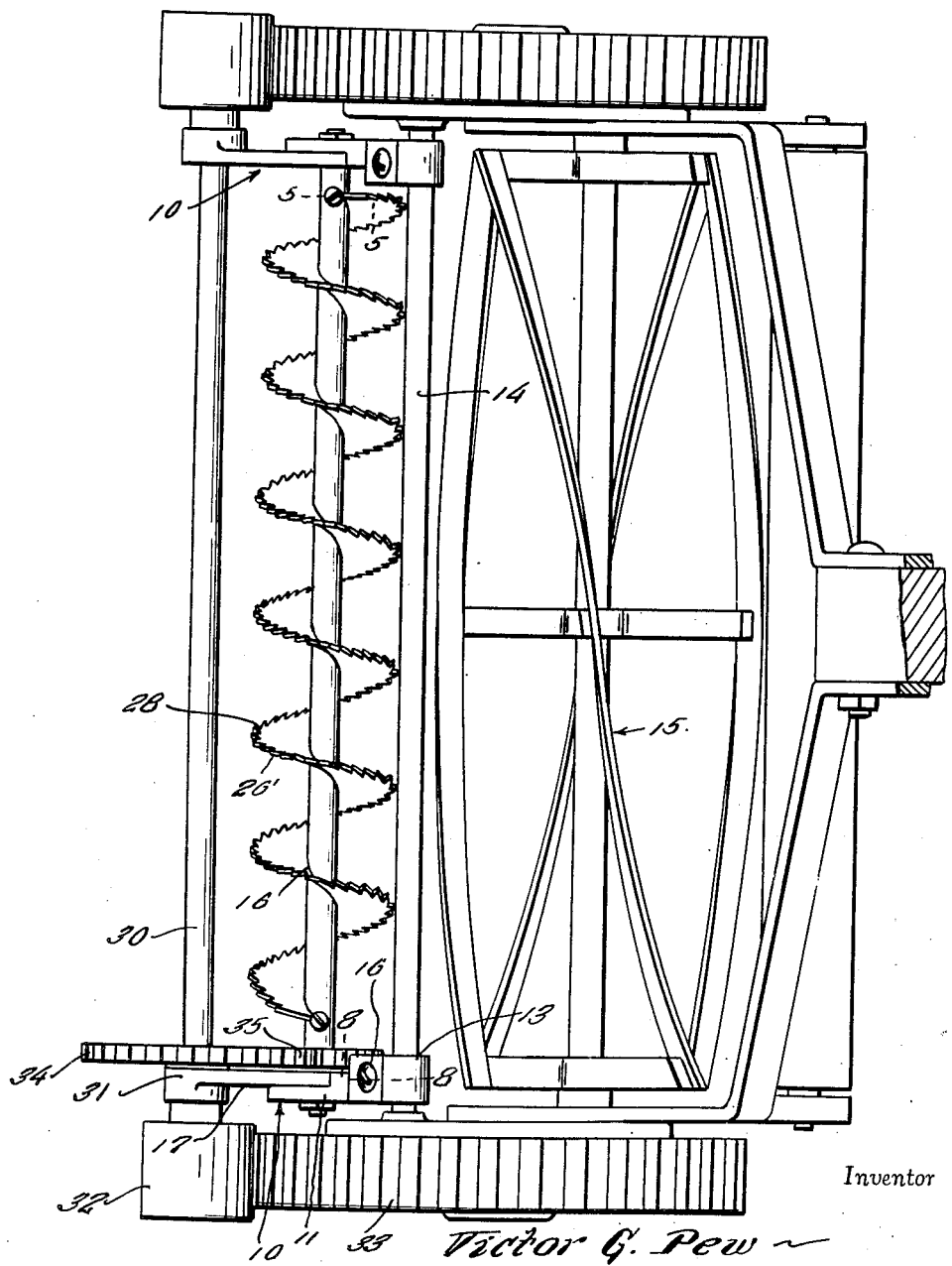
Figure 1 is a top plan view illustrating the application of the invention to the lawn mower.

Figures 5 and 8 are detail sectional views taken substantially on lines 5—5 and 8—8, respectively, of Figure 1.

Figure 6 is a detail sectional view showing the means for supporting one end of the shaft of the attachment.

Figure 7 is a perspective view of the clamp-equipped section or plate of one of the brackets.

Figure 9 is a detail sectional view taken substantially on line 9—9 of Figure 3.

Referring to the drawings by reference numerals, it will be seen that the invention comprehends the provision of a pair of suitable brackets 10—10, and each bracket comprises an attaching section or plate 11 provided with a clamp that includes a fixed clamp member 12 and a removable clamp member 13. The clamp members 12 and 13 are adapted to embrace the usual rod 14 provided on the lawn mower forwardly of the reel 15 thereof and as clearly shown in Figures 1 and 3. The clamp members 12 and 13 are secured together through the medium of a screw 16 as shown in Figure 8.

Each clamp also includes a plate-like section 17 that is connected with the section 11 for adjustment relative thereto through the medium of bolt and nut means 18 operating in suitable slots 19 as provided in the section 11.

Each of the plate-like sections 17 of the clamp are provided with arcuate slots 20 in which operate journal pins 21 that are secured at the desired adjustment through the medium of a collar 22 and washers 23 and nuts 24 as will be clear from a study of Figure 6. At the inner end thereof each journal pin has a reduced end adapted to be received in a socket in one end of a shaft 25 as will also be clear from a study of Figure 6 and as indicated at 26.

Rotatable with the shaft 25 as an axis is an elongated sleeve or hub 27 to which is spirally secured a screw member 28, the ends of said member being formed to provide sleeves for accommodating securing bolts 29 as clearly shown in Figure 5, and which also secure sleeve 27 to shaft 25.

The blades or spirals of the member 28 have the edges thereof serrated to provide a continuous series of teeth 26' that, as the member 28 revolves, engage the long grass bending the same in the direction of the reel 15 so that such long blades of grass may be cut by the reel during the mowing of the grass.

For driving the member 28 there is provided a shaft 30 that is journaled in suitable bearings 31 provided in the upper corners of the plate sections 17. The ends of the shaft 30 are equipped with rollers 32 that are engaged by the peripheries of the wheels 33 of the lawn mower in a manner to transmit movement of the wheels to the shaft 30. At one end thereof the shaft 30 is equipped with a gear 34 that is in mesh with a gear 35 provided on one end of the sleeve 27, and through the medium of the gearing 34 and 35 the member 28 is driven directly from the shaft 30.

From the above it will be apparent that by adjusting the plate sections 17 relative to the plate sections 11, the member 28 may be positioned nearer to or farther away from the reel 15; while through the medium of the slots 20 and the journal pins 21, member 28 may be placed at the desired elevation relative to the grass.

In operation it will be apparent that as the lawn mower is moved over the grass, motion is transmitted from the wheels 33 through the pulleys 22, gearing 34 and 35, to the member 28 causing the latter to revolve. As the member 28 revolves the teeth thereof engage the high grass, bending and guiding the grass towards the reel 15 to be cut thereby. Thus with this attachment to the lawn mower, it will not be necessary, either before or after the mowing of the grass with the lawn mower to go over the area mowed with a sickle or the like for cutting the tall grass which could not be taken care of by the lawn mower.

What is claimed is:

1. In a lawn mower having tread wheels, a reel, and a connecting bar forwardly of the reel, spaced brackets secured to the connecting bar, a screw member having a serrated continuous spiral edge rotatably supported between the brackets for engaging the tall grass and bending and guiding the same towards the reel to be cut thereby, a shaft extending between and rotatably supported by said brackets, rollers on the ends of the shaft having frictional engagement with the peripheries of the tread wheels, and gearing connecting said shaft with said screw member for driving the latter.

2. A lawn mower having in combination a reel and a driven screw member mounted forwardly of and in operative position to the reel of the mower, said screw member having a serrated spiral edge for engaging, and bending and directing tall grass towards the reel of the mower to be cut by said reel, and means for driving said member.

3. For use with a lawn mover including a reel whereby the mower may be utilized for cutting tall grass, an elongated screw member rotatably mounted on the mower in advance of and in operative position to the reel of the mower, said screw member having the convolutions thereof provided with teeth for engaging and directing the tall grass towards the reel, and motion transmitting means connecting said spiral member with the tread wheels of the mower for revolving said screw member incidental to the revolving of the reel of the mower.

4. An attachment of the character described comprising a pair of bracket members each including a pair of complemental sections, means adjustably connecting said sections together, a single screw member rotatably supported by and extending between corresponding sections of said bracket members, a shaft rotatably supported by and extending between the said corresponding members of said brackets, motion transmitting means connecting said shaft with said screw member, and means on the ends of the shaft for driving the latter.

5. An attachment for lawn mowers comprising a pair of brackets including a fixed section provided with clamps for securing said section to the brace rod of a lawn mower, each of said brackets also including a second section, means adjustably connecting the second section of each bracket with the first section thereof, a screw member having a serrated edge rotatably supported between the second sections of the bracket for engaging and guiding tall grass towards the reel of the lawn mower, a shaft rotatably supported between the second sections of said brackets, rollers on the ends of said shaft for engaging the peripheries of the tread wheels of the lawn mower, and motion transmitting means connecting said shaft with the spiral member for driving the latter.

6. An attachment for lawn mowers comprising mounting brackets, each of said brackets including a clamp equipped section for attachment to the brace rod of a lawn mower, a bearing equipped section and means adjustably connecting the bearing equipped section with the clamp equipped section, each clamp equipped section being also provided with an arcuate bearing slot, journal pins having ends engaging the bearing slots, means on the ends of the journal pins for securing the latter at the desired adjustment, a shaft having ends engaged with the journal pins to rotate about said pins as an axis, and a screw member mounted on the shaft to rotate therewith and including a single spiral blade the convolutes of which have serrated edges to provide a sinuous series of teeth extending from one end to the other of said screw member.

VICTOR G. PEW.